United States Patent  (10) Patent No.: US 11,242,057 B2
Yu et al.  (45) Date of Patent: Feb. 8, 2022

(54) METHOD FOR OPTIMIZING THREE-POINT TURN OF AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Ning Yu, Sunnyvale, CA (US); Fan Zhu, Sunnyvale, CA (US); Xin Xu, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 257 days.

(21) Appl. No.: 16/693,054

(22) Filed: Nov. 22, 2019

(65) Prior Publication Data

US 2021/0155237 A1 May 27, 2021

(51) Int. Cl.
*B60W 30/18* (2012.01)
*B60W 40/105* (2012.01)
*G06K 9/00* (2006.01)

(52) U.S. Cl.
CPC .... *B60W 30/18009* (2013.01); *B60W 40/105* (2013.01); *G06K 9/00805* (2013.01); *B60W 2554/00* (2020.02)

(58) Field of Classification Search
CPC ............................................. B60W 30/18009
See application file for complete search history.

(56) References Cited

U.S. PATENT DOCUMENTS

| 2020/0133272 | A1* | 4/2020 | Chong | G01C 21/3602 |
| 2020/0172089 | A1* | 6/2020 | Dyer | B60W 30/06 |
| 2020/0257317 | A1* | 8/2020 | Musk | G05D 1/0088 |
| 2020/0356090 | A1* | 11/2020 | Thakur | B60W 60/00253 |
| 2020/0410853 | A1* | 12/2020 | Akella | B60W 30/0956 |
| 2021/0116916 | A1* | 4/2021 | He | G05D 1/0221 |
| 2021/0139038 | A1* | 5/2021 | Wang | B60W 30/18 |

FOREIGN PATENT DOCUMENTS

| CN | 108698604 A | * | 10/2018 | G06T 15/20 |
| DE | 102015212109 A1 | * | 1/2017 | B60T 7/12 |
| GB | 2571149 A | * | 8/2019 | B60W 30/06 |

* cited by examiner

*Primary Examiner* — Alex C Dunn
(74) *Attorney, Agent, or Firm* — Womble Bond Dickinson (US) LLP

(57) ABSTRACT

In one embodiment, it is determined that a speed of an autonomous driving vehicle (ADV) is below a predetermined speed threshold during a current turn section of a three-point turn, where the three-point turn includes at least three turn sections. In response, detecting an obstacle within a predetermined proximity of the ADV, determining a type of obstacle. An amount of time during which the speed of the ADV remains below the predetermined speed threshold is determined. It is determined whether the amount of time is greater than a time threshold corresponding to the type of the obstacle. If the amount of time is greater than the time threshold, the current turn section is ended and a next turn section is started.

20 Claims, 10 Drawing Sheets

METHOD FOR OPTIMIZING THREE-POINT TURN OF AUTONOMOUS DRIVING VEHICLES

TECHNICAL FIELD

Embodiments of the present disclosure relate generally to operating autonomous vehicles. More particularly, embodiments of the disclosure relate to three-point turn of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In particular, a three-point operation is a difficult operation, especially during autonomous driving. Typically, a three-point turn requires a series of short movements of the vehicle. Most of the methods are rule based with specific parameters. It is difficult to deal with complex scenario, especially with many obstacles. There has been a lack of efficient way for performing a three-point turn.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, it is determined that a speed of an autonomous driving vehicle (ADV) is below a predetermined speed threshold during a current turn section of a three-point turn, where the three-point turn includes at least three turn sections. In response, detecting an obstacle within a predetermined proximity of the ADV, determining a type of obstacle. An amount of time during which the speed of the ADV remains below the predetermined speed threshold is determined. It is determined whether the amount of time is greater than a time threshold corresponding to the type of the obstacle. If the amount of time is greater than the time threshold, the current turn section is ended and a next turn section is started.

In one embodiment, an obstacle can be a pedestrian, a vehicle, or a bicycle. The time threshold may be determined based on the type of the obstacle and a motion type of the obstacle, where the motion type indicates whether the obstacle is a static obstacle or a dynamic obstacle. In one embodiment, a percentage of completeness of the current turn section is determined, where the time threshold is further determined based on the percentage of the completeness of the current turn section. In another embodiment, an obstacle factor is further determined, where the time threshold is determined further based on the obstacle factor. The obstacle factor may be determined further base on the motion type of the obstacle. In one embodiment, the time threshold is determined by performing a lookup operation in an obstacle curve representing a relationship between an expected time and a particular percentage of completeness of current turn section. The obstacle factor curve is one of the obstacle factor curves corresponding to different obstacle factors.

Figure 1:
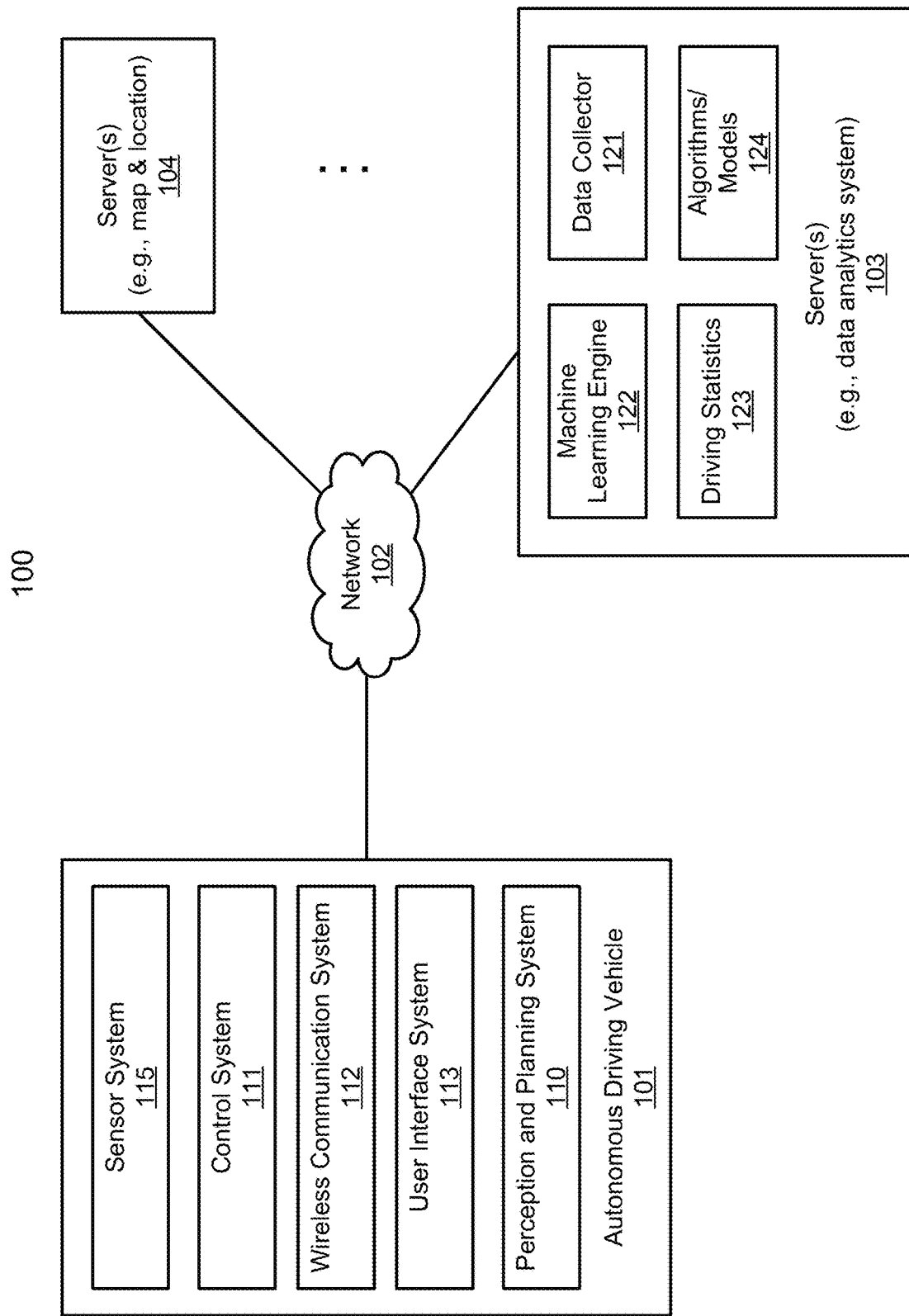
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
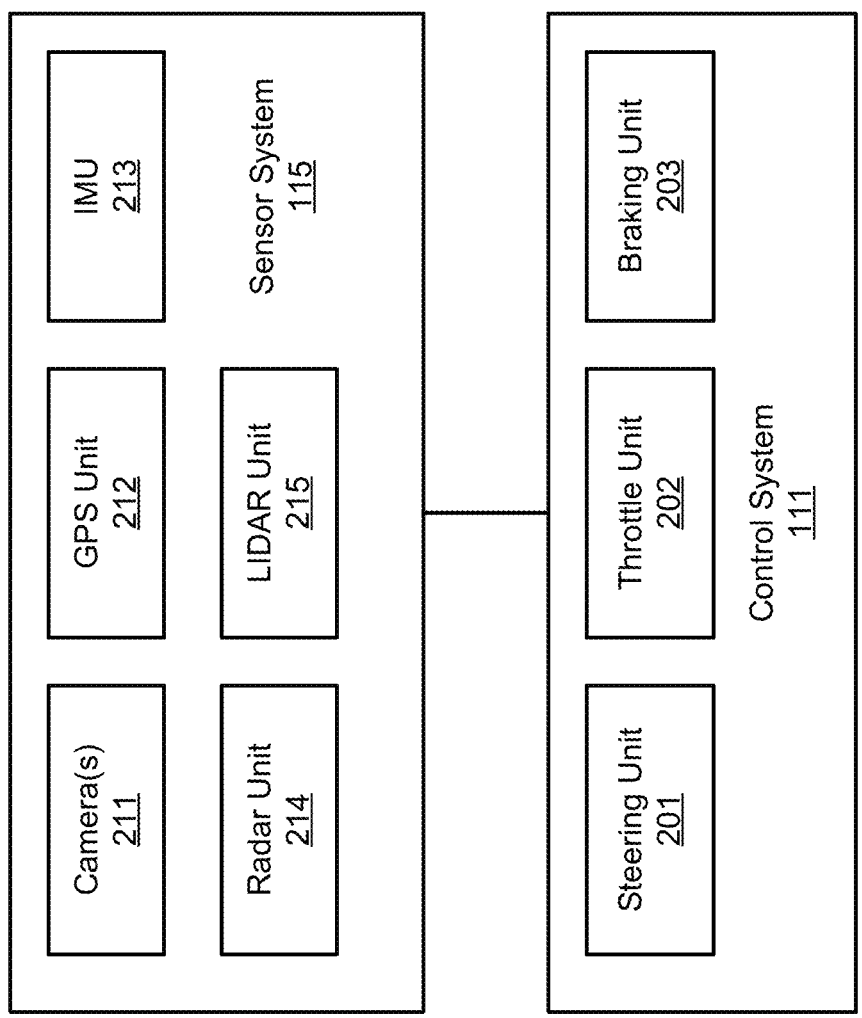
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to determine an optimized point of ending a turn section of a three-point turn, including determining waiting time when a speed of the vehicle is below a predetermined threshold against an expected time of an obstacle in view based on the type of the obstacle. Algorithms 124 can then be uploaded on ADVs to be utilized during autonomous driving in real-time.

Figure 3A:
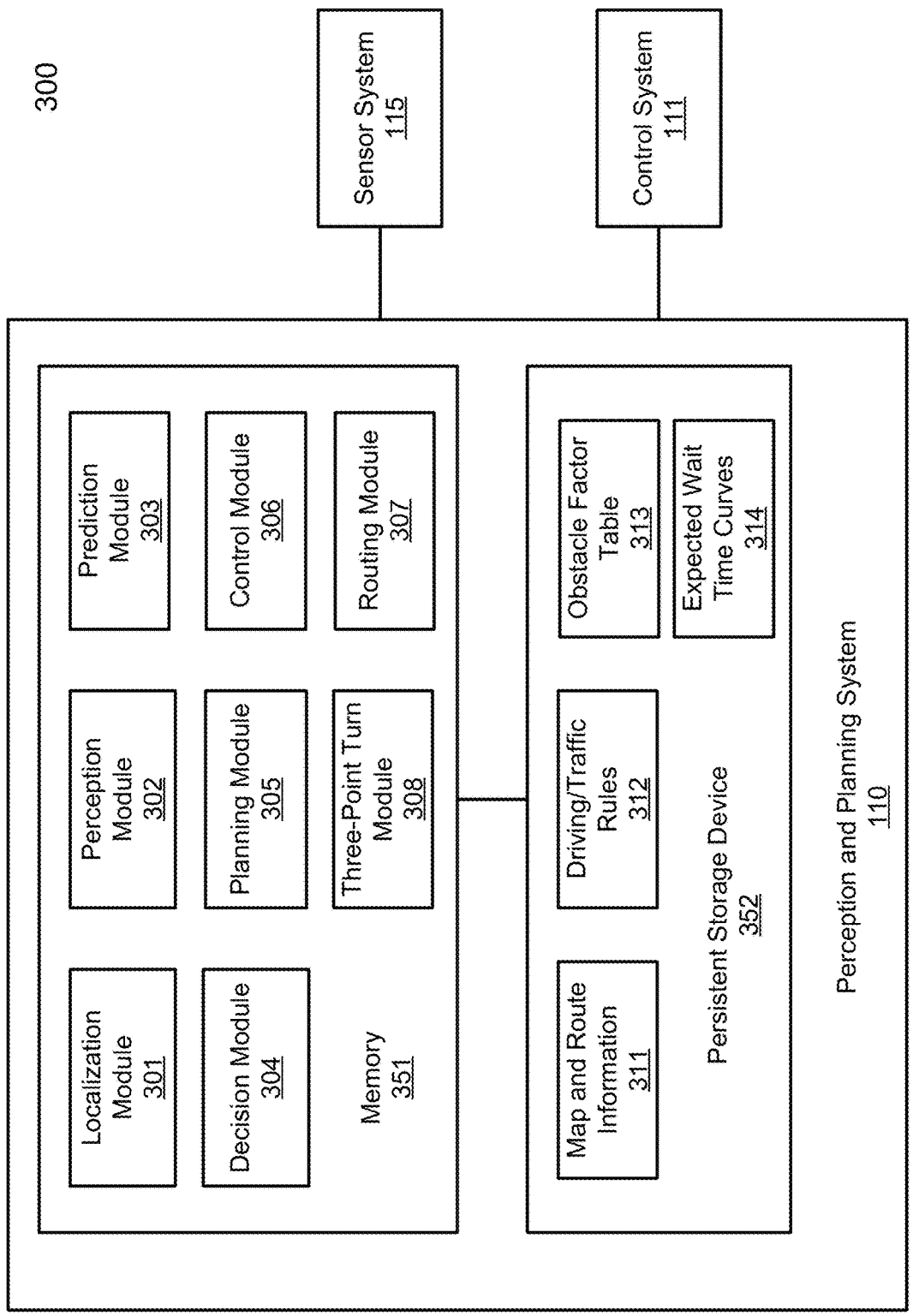
FIGS. 3A-3B are block diagrams illustrating an example of a perception and planning system used with an autonomous vehicle according to one embodiment.
Figure 3B:
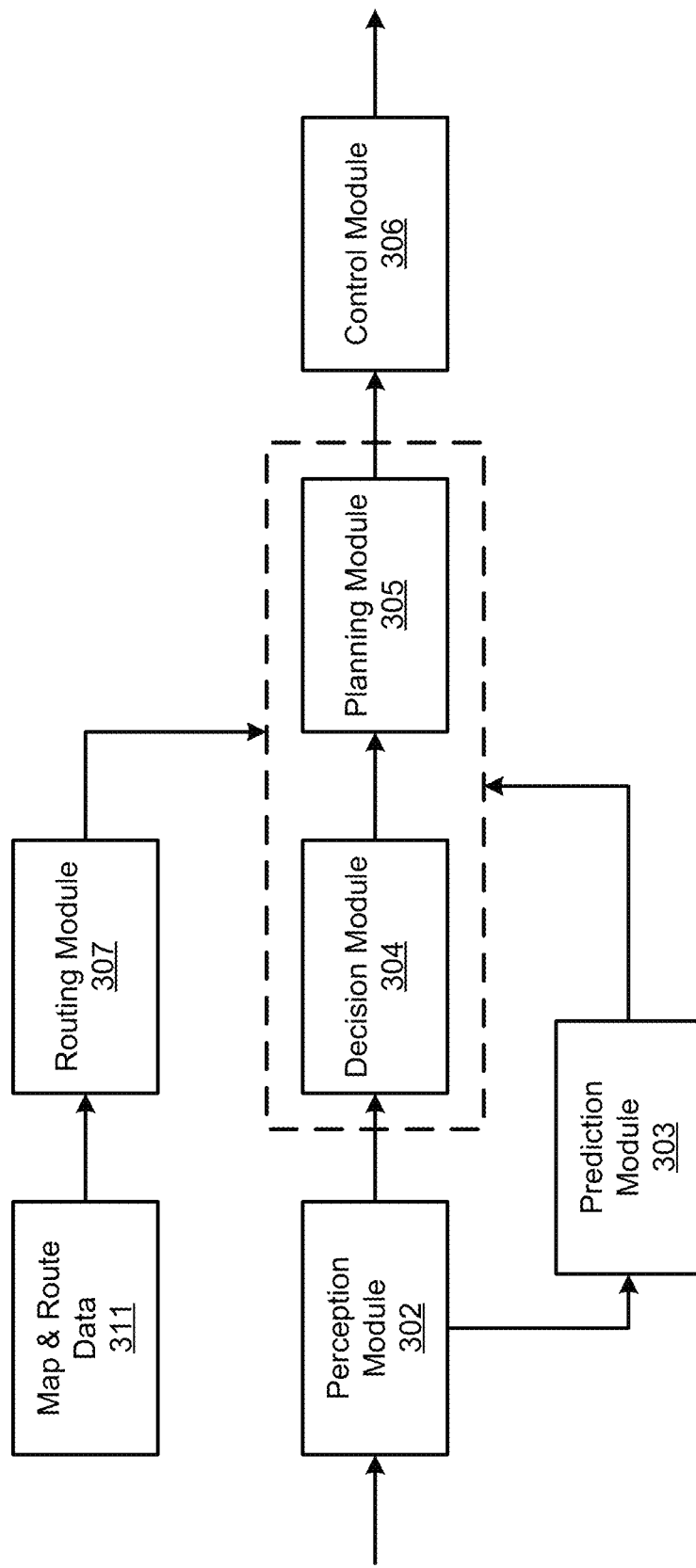

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and three-point turn module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition.

That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, three-point turn module 308 is configured to configure and perform a three-point turn. The three-point turn module 308 determines different turn sections of a three-point turn and determines when a particular turn section ends and a next turn section starts based on a set of algorithms 313-314 to optimize the three-point turn.

Figure 4:
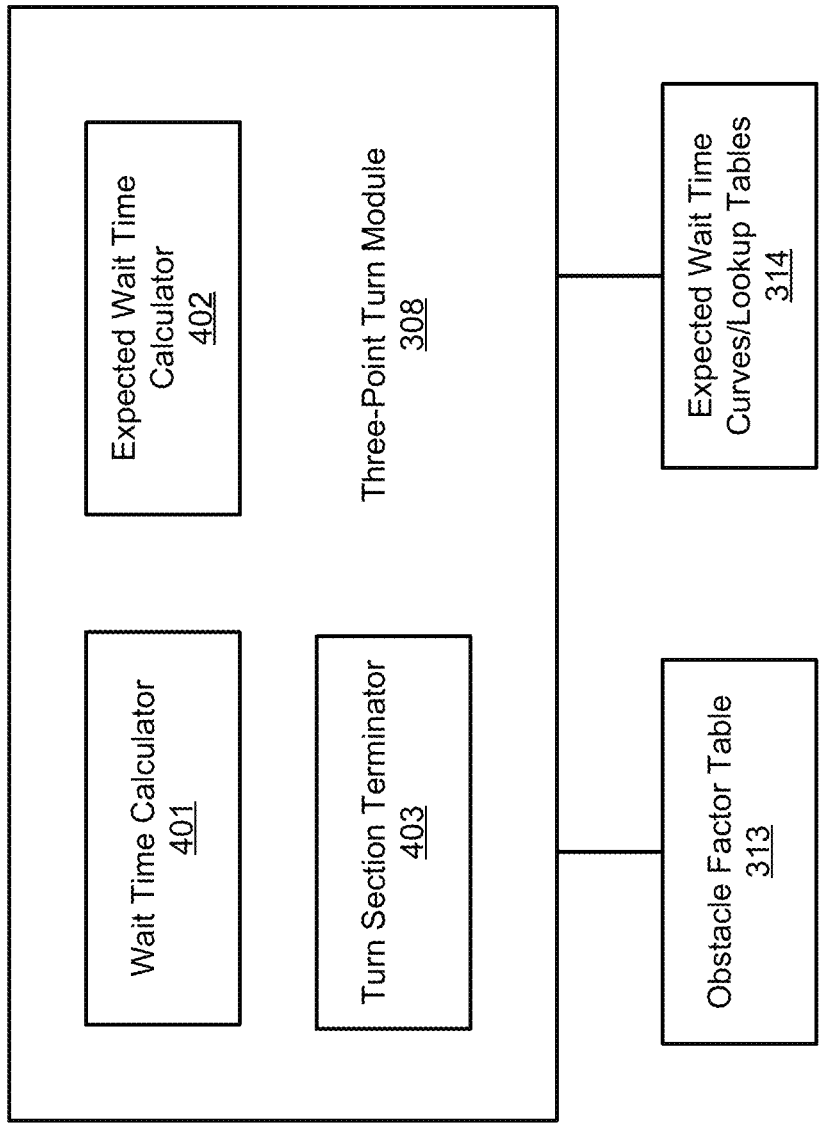
FIG. 4 is a block diagram illustrating an example of a three-point turn module according to one embodiment.

FIG. 4 is a block diagram illustrating an example of a three-point turn module according to one embodiment. Referring to FIG. 4, in one embodiment, three-point turn module 308 includes, amongst others, wait time calculator 401, expected wait time calculator 402, and section terminator 403 based on algorithms 313-314. In one embodiment, in response to detecting that the speed of an ADV is below a predetermined speed threshold, wait time calculator 401 is configured to calculate an amount of time during which the speed of the ADV remains below the predetermined speed threshold (e.g., zero speed) using a wait time determination algorithm. In one embodiment, the wait time algorithm may simply be the predetermined speed threshold.

Expected wait time calculator 402 is configured to calculate an expected wait time a typical vehicle will wait under the same or similar circumstances, using an expected wait time algorithm 314. The expected wait time varies dependent upon the driving environment or driving scenario at the point in time. In one embodiment, based on the calculated wait time and the expected wait time, section terminator 403 is configured to determine whether it is time to end the current turn section and to start a next turn section. In one embodiment, if the calculated wait time is greater than the expected wait time, section terminator 403 may decide that the current turn section should ends and the next turn section should start.

Figure 5:
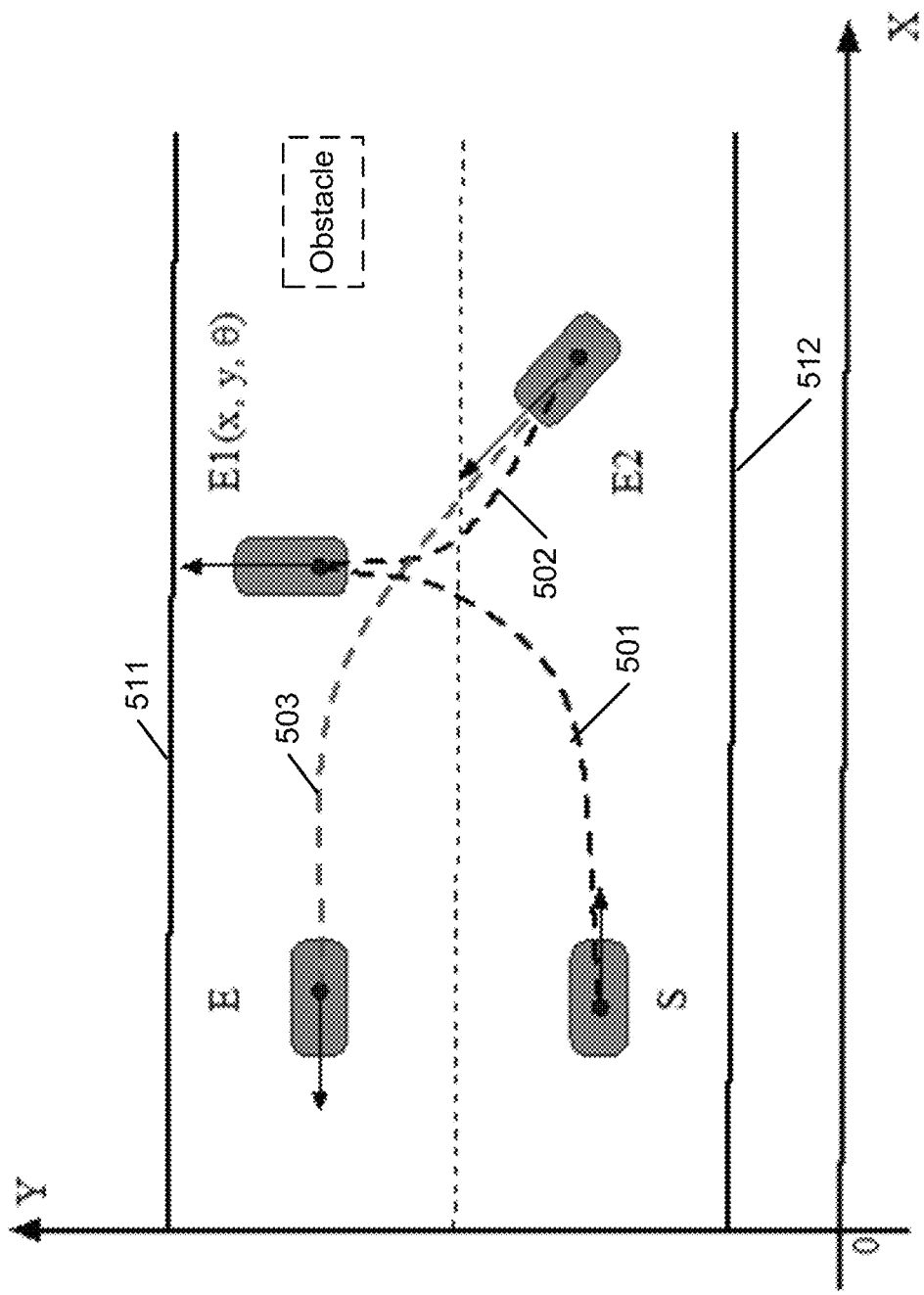
FIG. 5 shows a three-point turn driving scenario according to one embodiment.

Referring now to FIG. 5, which shows a typical three-point turn scenario. In this example, the three-point turn includes a first turn section 501, a second turn section 502, and a third turn section 503. In this scenario, the vehicle moves forwardly and turns left along the first turn section or first turn path 501 until it reaches near the opposing lane curb 511. Then the vehicle moves backwardly along the second turn section or second turn path 502 until it reaches near lane curb 512. Thereafter, the vehicle moves forwardly along the third turn section or third turn path 503 to complete the three-point turn.

Typically, due to the dramatic direction change between two turn sections, the vehicle typically waits a little bit more time before changing direction from one turn section to another turn section. The amount of time the vehicle waits varies dependent upon the driving environment or driving scenario. For example, when there is an obstacle such as another vehicle or a pedestrian nearby, the amount of wait time may be longer than there is no obstacle nearby.

In one embodiment, the expected wait time may be preconfigured for a variety of driving environments or driving scenarios. The preconfigured expected wait time may be configured as a lookup table or expected time curve. For each of the predetermined driving scenarios, a specific expected time lookup table or expected time curve may be preconfigured based on a large amount of driving statistics collected by a variety of vehicles. In one embodiment, the expected wait time is related to a percentage of completeness of the current turn section. That is, the expected wait time depends on where in the current turn section the vehicle is located. When the completeness percentage is low, the expected wait time is longer. In contrast, when the completeness percentage is higher, the expected wait time is shorter.

In one embodiment, when there is an obstacle nearby, the expected wait time may be different dependent upon the type of the obstacle and/or whether the obstacle is moving (e.g., static obstacle or dynamic obstacle such as vehicle, pedestrian, bike). Each type of obstacles may be considered as an obstacle factor that is utilized to determine a specific expected wait time curve for the purpose of determining an expected time corresponding to the same or similar type of obstacle.

Figure 6A:
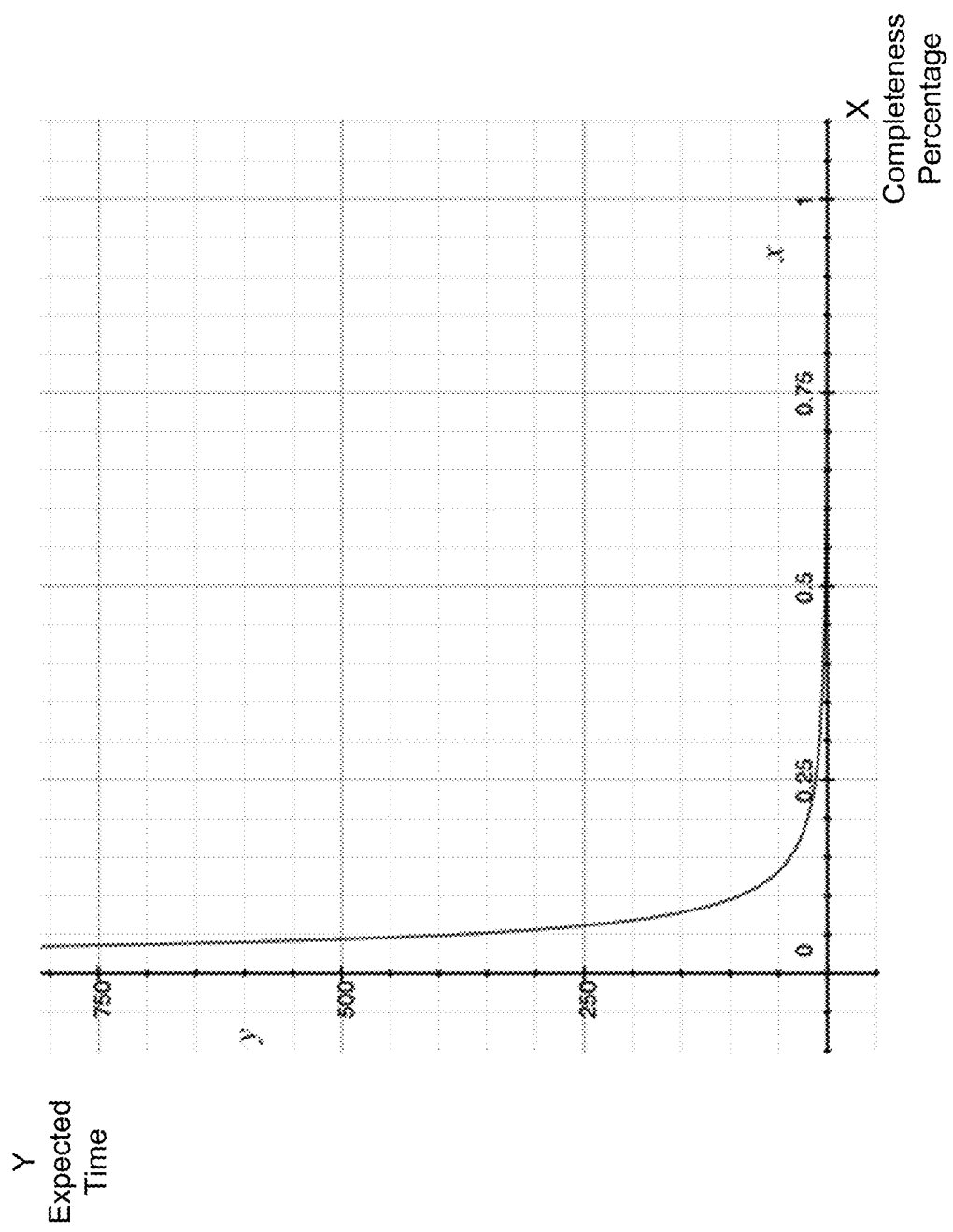
FIGS. 6A and 6B shows various expected time curves according to certain embodiments.

FIG. 6A shows an example of an expected wait time curve corresponding to a driving environment in which there is no obstacle nearby according to one embodiment. Referring to FIG. 6A, the Y axis represents the expected wait time and the X axis represents the completeness percentage of the current turn section. When the calculated wait time is greater than the expected wait time at a particular completeness percentage, it is considered it is time to finish the current turn section and switch to next turn section.

In one embodiment, the expected wait time Y may be determined based on the following formula:

$$Y = \frac{1-X}{X^2}$$

X is path completeness percentage, 0<=X<=1. Y is expected wait time when vehicle is stopped during making a three-point turn. Tw is vehicle stopped waiting time. If Tw>Y, which means it is right time to finish current step and switch to next turn section.

Figure 6B:
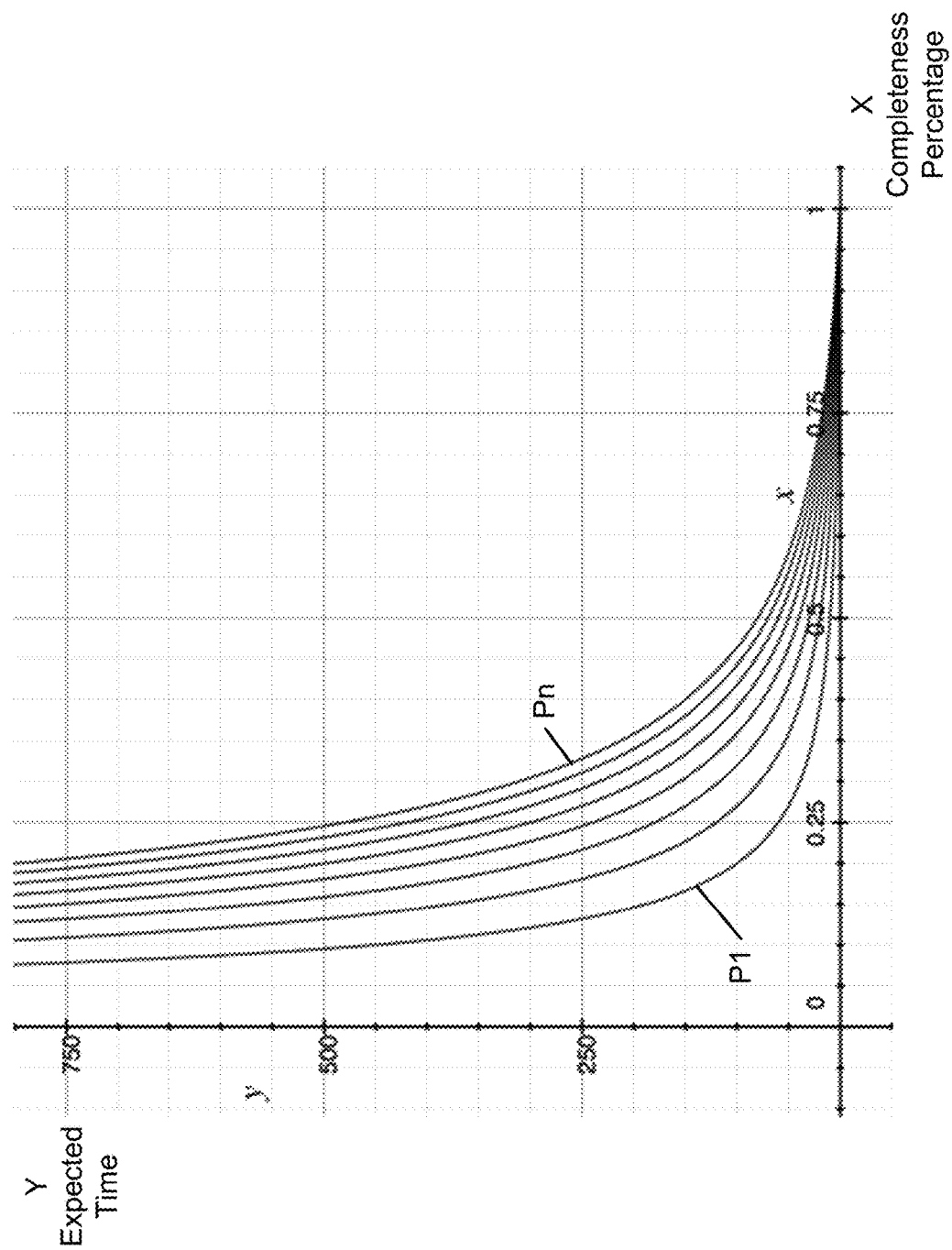

As described above, if there is an obstacle nearby, the corresponding expected wait time curve may be utilized, which may be different dependent upon the type of the obstacle and/or the motion type. FIG. 6B shows an expected wait time curve according to one embodiment. Referring to FIG. 6B, there are multiple expected wait time curves, each corresponding to one of the multiple obstacle factors representing different types of obstacles and motion types of the obstacles. In one embodiment, an obstacle factor represents a combination of a type of an obstacle and a motion type of the obstacle.

In one embodiment, the expected wait time Y may be determined based on the following formula:

$$y = P\frac{1-x}{x^2}$$

Figure 7:
FIG. 7 shows an obstacle factor lookup table according to one embodiment.

P is a ratio relative with obstacle, referred to herein as an obstacle factor. P is determined by x and obstacle type, such as car, pedestrian. In addition, the obstacle motion type should be taken into consideration, such as static obstacle or dynamic obstacle with specified speed and trajectory. FIG. 7 shows a lookup table for determining obstacle factors based on the types of the obstacles and motion types of the obstacles. The lookup table includes a number of mapping entries. Each mapping entry maps a combination of a type of an obstacle 701 and a motion type of the obstacle 702 to an obstacle factor 703. Based on the type of an obstacle and a motion type of the obstacle, a corresponding obstacle factor can be determined. Based on the obstacle factor, one of the expected time curves shown in FIG. 6B can be selected for determining the expected wait time in view of the completeness percentage of the current turn section.

Figure 8:
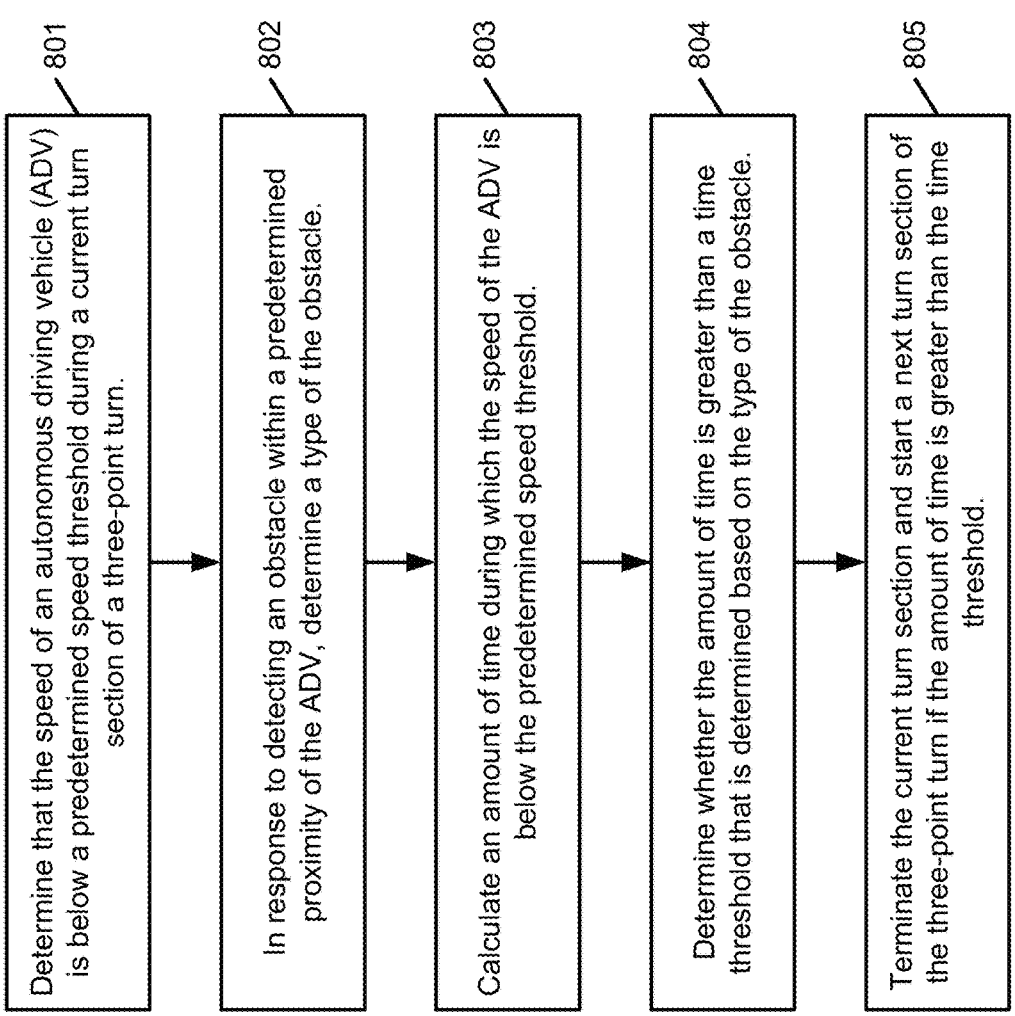
FIG. 8 is a flow diagram illustrating a process of a three-point turn according to one embodiment.

FIG. 8 is a flow diagram illustrating an example of a process of optimizing a three-point turn during autonomous driving according to one embodiment. Process 800 may be performed by processing logic which may include software, hardware, or a combination thereof. For example, process 800 may be performed by three-point turn module 308. Referring to FIG. 8, at block 801, processing logic determines that a speed of an ADV is below a predetermined speed threshold during a current turn section of a three-point turn, where the three-point turn includes at least three turn sections or segments. In response to determining an obstacle within a predetermined proximity of the ADV, at block 802, processing logic determines a type of the obstacle. At block 803, processing logic calculates an amount of time (e.g., wait time) during which the speed of the ADV remains below the predetermined speed threshold based on the type of the obstacle. At block 804, processing logic determines whether the amount of time is greater than a time threshold (e.g., expected time) that is determined based on a type of the obstacle and/or a motion type of the obstacle. If so, at block 805, the current turn section is terminated and a next turn section is started.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of performing a three-point turn of an autonomous driving vehicle, the method comprising:
    determining that a speed of an autonomous driving vehicle (ADV) is below a predetermined speed threshold during a current turn section of a three-point turn, the three-point turn having at least three turn sections;
    in response to detecting an obstacle within a predetermined proximity of the ADV, determining a type of the obstacle;
    calculating an amount of time during which the speed of the ADV remains below the predetermined speed threshold;
    determining whether the amount of time is greater than a time threshold that is determined based on the type of the obstacle; and
    terminating the current turn section and starting a next turn section of the three-point turn of the ADV, in response to determining that the amount of time is greater than a time threshold.

2. The method of claim 1, wherein the type of obstacle includes one of a pedestrian, a vehicle, and a bike.

3. The method of claim 1, further comprising determining the time threshold based on the type of the obstacle and a motion type of the obstacle, wherein the motion type indicates whether the obstacle is a static obstacle or a dynamic obstacle.

4. The method of claim 3, further comprising determining a percentage of completeness of the current turn section, wherein the time threshold is determined further based on the percentage of the completeness of the current turn section.

5. The method of claim 4, further comprising calculating an obstacle factor based on the type of the obstacle, wherein the time threshold is determined further based on the obstacle factor of the obstacle.

6. The method of claim 5, wherein the obstacle factor is calculated further based on the motion type of the obstacle.

7. The method of claim 5, wherein the time threshold is determined by performing a lookup operation in an obstacle curve representing a relationship between an expected time and a particular percentage of completeness of the current turn section.

8. The method of claim 7, wherein the obstacle factor curve is one of a plurality of obstacle factor curves corresponding to a plurality of different obstacle factors.

9. A non-transitory machine-readable medium having instruction stored therein, which when executed by a processor, cause the processor to perform operations of a three-point turn of an autonomous driving vehicle, the operations comprising:
    determining that a speed of an autonomous driving vehicle (ADV) is below a predetermined speed threshold during a current turn section of a three-point turn, the three-point turn having at least three turn sections;
    in response to detecting an obstacle within a predetermined proximity of the ADV, determining a type of the obstacle;
    calculating an amount of time during which the speed of the ADV remains below the predetermined speed threshold;
    determining whether the amount of time is greater than a time threshold that is determined based on the type of the obstacle; and
    terminating the current turn section and starting a next turn section of the three-point turn of the ADV, in response to determining that the amount of time is greater than a time threshold.

10. The machine-readable medium of claim 9, wherein the type of obstacle includes one of a pedestrian, a vehicle, and a bike.

11. The machine-readable medium of claim 9, wherein the operations further comprise determining the time threshold based on the type of the obstacle and a motion type of the obstacle, wherein the motion type indicates whether the obstacle is a static obstacle or a dynamic obstacle.

12. The machine-readable medium of claim 11, wherein the operations further comprise determining a percentage of completeness of the current turn section, wherein the time threshold is determined further based on the percentage of the completeness of the current turn section.

13. The machine-readable medium of claim 12, wherein the operations further comprise calculating an obstacle factor based on the type of the obstacle, wherein the time threshold is determined further based on the obstacle factor of the obstacle.

14. The machine-readable medium of claim 13, wherein the obstacle factor is calculated further based on the motion type of the obstacle.

15. The machine-readable medium of claim 13, wherein the time threshold is determined by performing a lookup operation in an obstacle curve representing a relationship between an expected time and a particular percentage of completeness of the current turn section.

16. The machine-readable medium of claim 15, wherein the obstacle factor curve is one of a plurality of obstacle factor curves corresponding to a plurality of different obstacle factors.

17. A data processing system, comprising:
    a processor; and a memory coupled to the processor to store instructions, which when executed by the processor, cause the processor to perform operations of a three-point turn, the operations including
- determining that a speed of an autonomous driving vehicle (ADV) is below a predetermined speed threshold during a current turn section of a three-point turn, the three-point turn having at least three turn sections,
- in response to detecting an obstacle within a predetermined proximity of the ADV, determining a type of the obstacle,
- calculating an amount of time during which the speed of the ADV remains below the predetermined speed threshold,
- determining whether the amount of time is greater than a time threshold that is determined based on the type of the obstacle, and
- terminating the current turn section and starting a next turn section of the three-point turn of the ADV, in response to determining that the amount of time is greater than a time threshold.

18. The system of claim 17, wherein the type of obstacle includes one of a pedestrian, a vehicle, and a bike.

19. The system of claim 17, wherein the operations further comprise determining the time threshold based on the type of the obstacle and a motion type of the obstacle, wherein the motion type indicates whether the obstacle is a static obstacle or a dynamic obstacle.

20. The system of claim 19, wherein the operations further comprise determining a percentage of completeness of the current turn section, wherein the time threshold is determined further based on the percentage of the completeness of the current turn section.

* * * * *